United States Patent
Tate, Jr. et al.

(10) Patent No.: US 8,522,943 B2
(45) Date of Patent: Sep. 3, 2013

(54) ELECTROMAGNETICALLY CONTROLLED CLUTCH ASSEMBLY AND CONTROL METHOD FOR THE SAME

(75) Inventors: Edward D. Tate, Jr., Grand Blanc, MI (US); Alan G. Holmes, Clarkston, MI (US)

(73) Assignee: GM Global Technology Operation LLC, Detroit, MI (US)

( * ) Notice: Subject to any disclaimer, the term of this patent is extended or adjusted under 35 U.S.C. 154(b) by 365 days.

(21) Appl. No.: 13/041,476

(22) Filed: Mar. 7, 2011

(65) Prior Publication Data
US 2012/0228076 A1 Sep. 13, 2012

(51) Int. Cl.
*F16D 27/108* (2006.01)
(52) U.S. Cl.
USPC .................. 192/84.92; 192/69.1; 192/69.61
(58) Field of Classification Search
USPC .............................................. 192/84.92, 69.1
See application file for complete search history.

(56) References Cited

U.S. PATENT DOCUMENTS

| | | | | |
|---|---|---|---|---|
| 3,917,042 | A * | 11/1975 | Summa | 192/84.92 |
| 4,567,975 | A * | 2/1986 | Roll | 192/84.961 |
| 7,325,664 | B2 * | 2/2008 | Fusegi | 192/84.92 |
| 2012/0103746 | A1 * | 5/2012 | Bird | 192/46 |
| 2012/0152687 | A1 * | 6/2012 | Kimes et al. | 192/84.2 |

* cited by examiner

*Primary Examiner* — Richard M. Lorence
(74) *Attorney, Agent, or Firm* — Quinn Law Group, PLLC

(57) ABSTRACT

An electromagnetic (EM) clutch assembly includes input and output discs, a plunger, a control solenoid, and a controller. The input disc is connected to a rotatable input member, and defines an input face having a mechanical feature. The output disc is connected to a rotatable output member, and includes a bore wall defining a bore. The plunger is positioned at least partially within the bore. The controller transmits a time-varying electrical control signal to the solenoid to thereby resonate the plunger toward the input disc, and transmits a steady-state electrical control signal to capture the plunger in an engaged position. Rotation of the discs is controlled until the plunger encounters the mechanical feature, thereby placing the assembly in an engaged state. A vehicle having a transmission and the EM clutch assembly is also disclosed, as is a method for controlling the clutch assembly via the electrical control signals.

16 Claims, 3 Drawing Sheets

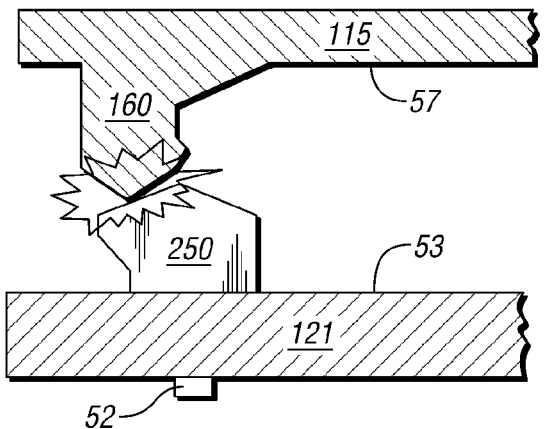
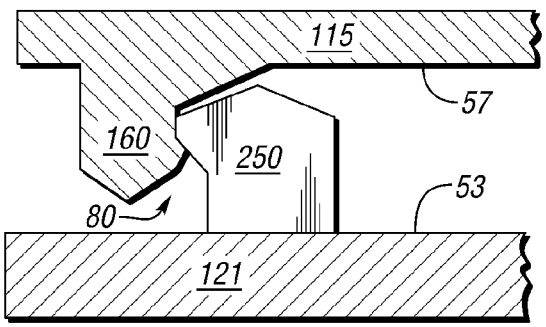
FIG. 5  FIG. 6
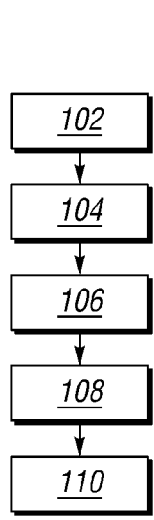
FIG. 7
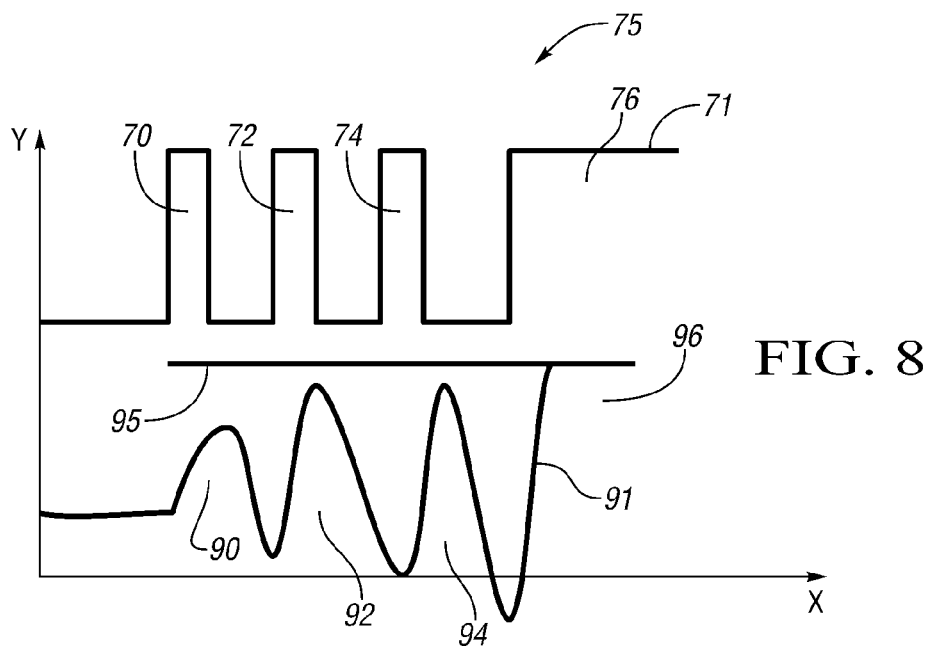
FIG. 8

ELECTROMAGNETICALLY CONTROLLED CLUTCH ASSEMBLY AND CONTROL METHOD FOR THE SAME

TECHNICAL FIELD

The present disclosure relates to an electromagnetically controlled clutch assembly which is resistant to inadvertent engagement due to an electrical fault condition.

BACKGROUND

In a vehicle having one or more prime movers, e.g., an internal combustion engine and/or one or more electric traction motors, torque is generated by the prime mover and delivered to a transmission input shaft. A transmission output shaft ultimately powers a set of drive wheels to thereby propel the vehicle. Within the transmission, a clutch may be controlled to selectively couple various rotatable members. When fully engaged, the clutch locks a pair of shafts together so that they may rotate in unison. The same clutch may also be allowed to slip so that the shafts rotate at different relative speeds.

Conventional hydraulic clutches are actuated using hydraulic pressure. Electromagnetic (EM) clutch assemblies may be actuated electrically, but may transmit torque mechanically. When an input voltage is applied to the EM clutch, a stationary magnetic field generates flux which passes into a rotor of the clutch assembly. The flux moves an armature into contact with the rotor. Slip occurs between the rotor and the armature until clutch lockup occurs. The armature separates from the rotor when the magnetic field is discontinued, thus disengaging the clutch assembly. Other EM clutch designs may exist that operate according to similar principals.

SUMMARY

An improved electromagnetic (EM) clutch assembly is disclosed herein. Inadvertent engagement of the clutch due to an electric short or other electrical fault condition is possible in certain conventional EM clutch designs. The present EM clutch assembly instead requires a calibrated, time-varying electrical signal in order for engagement to occur. Inadvertent engagement under an electrical fault condition is prevented largely because energy can only be transferred into the present EM clutch assembly via dynamic changes in the applied electrical signal. As disclosed herein, multiple signal changes are required in order to transfer sufficient energy into an engagement mechanism of the clutch assembly.

In particular, an EM clutch assembly is disclosed herein which includes an input disc, an output disc, a plunger, a control solenoid, and a controller. The input disc is operatively connected to a rotatable input member, and defines an input face having a mechanical feature. The output disc is operatively connected to a rotatable output member, and includes a bore wall defining a bore. The plunger is positioned at least partially within the bore. The controller is configured to transmit a time-varying electrical control signal to the control solenoid to resonate the plunger toward and into close proximity of the input disc, and to transmit a steady-state electrical control signal to the solenoid to capture the plunger in an engageable position. The controller may further control rotation of the discs until the plunger encounters the mechanical feature, thereby placing the EM clutch assembly in an engaged state.

A coil may be used to generate magnetic flux. In one possible embodiment, a time constant of a traction motor is less than a mechanical time constant of the engagement mechanism and spring. The clutch assembly may be engaged by supplying a driving voltage or current at one or more frequencies, such that the engagement mechanism resonates with increasing amplitude. The spring may be configured in such as way that a step application of a voltage to the clutch assembly will not allow the clutch assembly to engage from a steady state location. The traction motor or another rotating component may be used to control relative shaft speeds during clutch engagement.

A vehicle is also disclosed having a transmission with a rotatable input shaft and a rotatable output shaft, and the EM clutch assembly noted above. The input disc is operatively connected to the input shaft, and the output disc is operatively connected to the output shaft.

A method for controlling the EM clutch assembly includes transmitting a time-varying electrical control signal from a controller to the control solenoid to resonate the plunger toward the input disc, and transmitting a steady-state electrical control signal to the solenoid to capture the plunger in an engageable position. The method further includes controlling rotation of the discs until the plunger encounters the mechanical feature, thereby placing the EM clutch assembly in an engaged state.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 5 is a schematic partial cross-sectional side view illustration of the discs shown in FIG. 3, with a mechanical feature of one disc designed to prevent engagement in one possible mode.

FIG. 6 is a schematic partial cross-sectional side view illustration of the discs shown in FIG. 4 in an engaged state.

FIG. 7 is a flow chart describing a method for controlling the EM clutch assembly shown in the various Figures.

FIG. 8 is a time plot of amplitude and position describing the control of the present EM clutch assembly.

DETAILED DESCRIPTION

Figure 1:
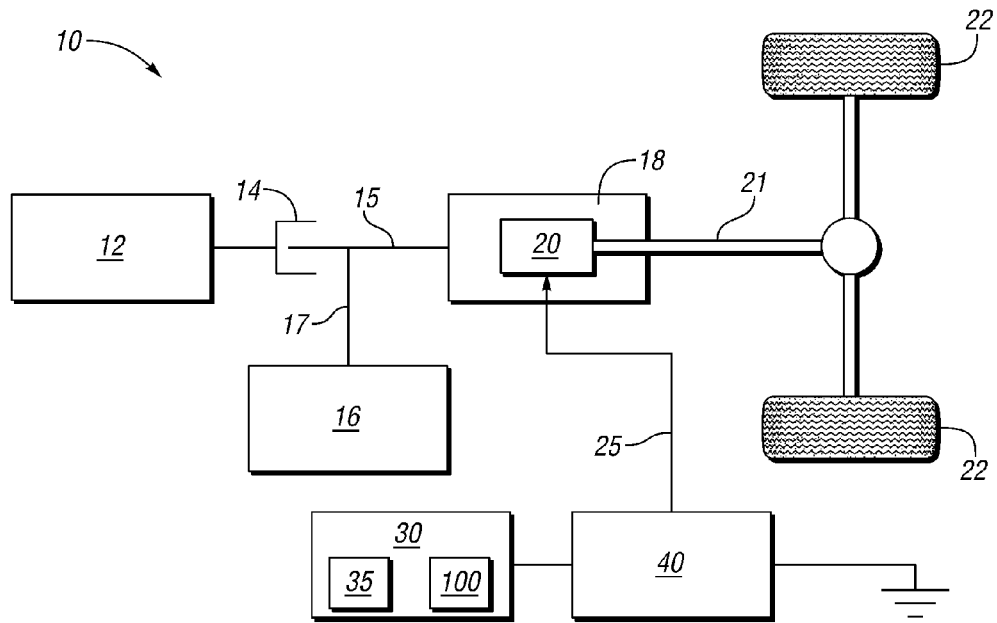
FIG. 1 is a schematic illustration of a vehicle having an electromagnetic (EM) clutch assembly as disclosed herein.

Referring to the drawings wherein like reference numbers correspond to like or similar components throughout the several figures, an example vehicle 10 is shown in FIG. 1. The vehicle 10 includes an electromagnetic (EM) clutch assembly 20 and a controller 30. The controller 30 is configured for executing a method 100 from memory 35 to thereby control the engagement and disengagement of the EM clutch assembly 20. Control over the EM clutch assembly 20, which is configured as a no-slip torque transfer device to reduce driveline losses, is achieved via electrical control signals 25.

The electrical control signals 25 are time-varying during the engagement phase and are steady-state or DC in the torque holding phase. Using the signals 25, the controller 30 is able to resonate the EM clutch assembly 20 into an engaged state and then hold or maintain such a state, as will be explained below with reference to FIGS. 2-6. Moreover, the present design precludes common electrical fault conditions such as shorts to ground or to power from causing an inadvertent engagement of the EM clutch assembly 20.

In one possible embodiment, the vehicle 10 of FIG. 1 may include an internal combustion engine 12 and an electric traction motor 16. Additional electric traction motors 16 may be present in alternate designs, e.g., a two-mode HEV. An input clutch 14 may be selectively actuated to connect the engine 12 to an input shaft 15 of a transmission 18 containing the EM clutch assembly 20. A motor shaft 17 of the electric traction motor 16 may be connected to the input shaft 15 either alone or in conjunction with the engine 12 depending on the transmission operating mode.

The transmission 18 includes an output shaft 21. The output shaft 21 ultimately transmits torque from the transmission 18 to a set of front and/or rear drive wheels 22 of the vehicle 10. While only two drive wheels 22 are shown in FIG. 1 for simplicity, the vehicle 10 could be equipped with all-wheel or four-wheel drive capability, and thus additional drive wheels 22 could be present.

The vehicle 10 includes an energy storage system (ESS) 40. The electrical control signals 25 are provided in part by the ESS 40, which may be a high-voltage battery module of the type used for powering the electric traction motor 16 in one possible embodiment. While not shown in FIG. 1 for simplicity, those of ordinary skill in the art will recognize that a typical HEV powertrain may include additional power components, including but not limited to a traction power inverter module (TPIM) and an auxiliary power module (APM)/DC-DC converter. In this manner, an AC voltage/current for the traction motor 16 may be converted to a suitable level of DC voltage/current for recharging the ESS 40 as needed, e.g., during regenerative braking FIG. 1 is intended to represent, schematically, that the controller 30 is able to generate and transmit the electrical control signals 25 in part by drawing power from the ESS 40, with the electrical energy provided by such signals 25 ultimately originating in the ESS 40.

Figure 2:
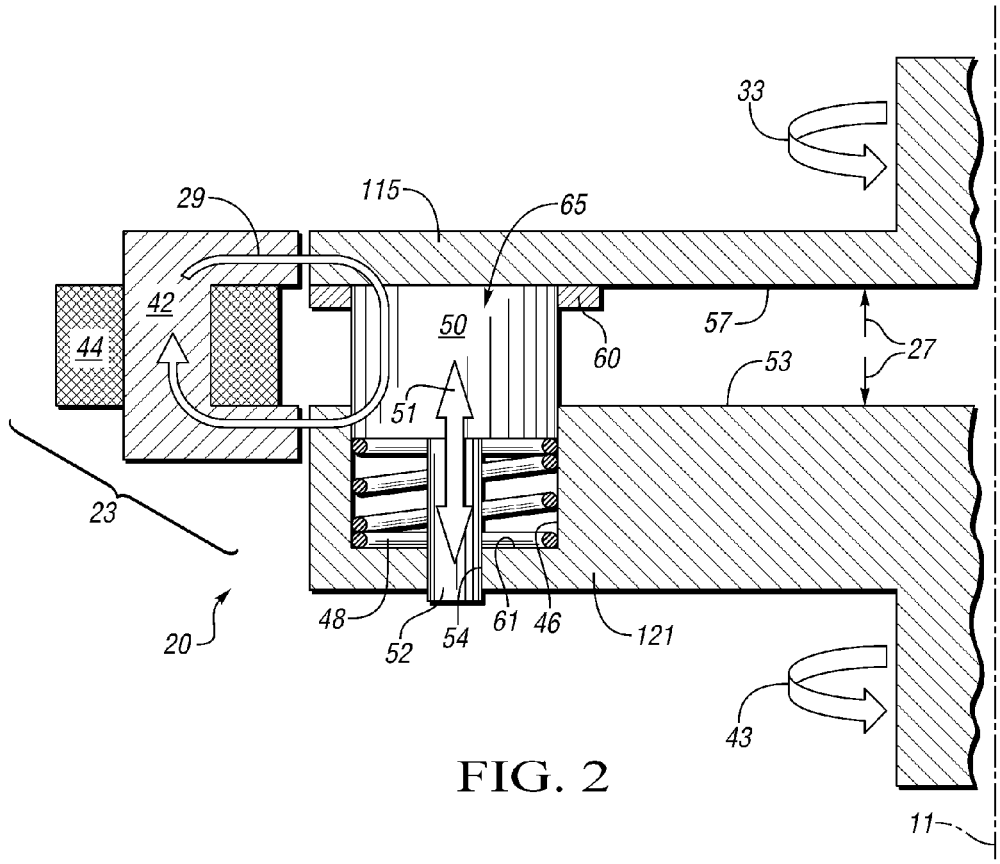
FIG. 2 is a schematic partial cross-sectional side view illustration of the present EM clutch assembly.

Referring to FIG. 2, the EM clutch assembly 20 includes an input disc 115 and an output disc 121. The input disc 115 is operatively connected to a rotatable input member, e.g., the input shaft 15 of FIG. 1. The input disc 115 defines an input face 57 having a mechanical feature 60 as described below. The mechanical feature 60 is shown schematically in FIG. 2, and may include at least one radial projection or surface feature having a suitable size, shape, and surface contour. The output disc 121 is likewise operatively connected to a rotatable output member, e.g., the output shaft 21 shown in FIG. 1. The discs 115, 121 rotate about an axis of rotation 11 in the direction respectively indicated by arrows 33 and 43. In the engaged state which is shown, the rotational speeds 33 and 43 are equal.

The output disc 121 defines a bore wall 46 that opens to an output face 53. The output face 53 is positioned adjacent to the input face 57, and is separated from the input face 57 by a calibrated distance (arrows 27). A plunger 50 is configured as an engagement mechanism for selectively locking the discs 115, 121. The plunger 50 is circumscribed by the bore wall 46, and is positioned at least partially within a void defined by the bore wall 46.

The plunger 50 may be biased using a spring 48, such as a coil or other suitable resilient member. The spring 48 may be positioned in a void defined by the bore wall 46, with the spring 48 resting on a floor 61 on one side of the spring 48 and contacting the plunger 50 on the other side of the spring 48. A stem 52 of the plunger 50 may protrude through an opening defined by a minor bore 54 in the output disc 121, with the stem portion 52 moving through the minor bore 54 in the alternate directions indicated by arrow 51 during engagement and disengagement of the EM clutch assembly 20.

The EM clutch assembly 20 further includes a control solenoid 23, which may be electrically connected to the ESS 40 shown in FIG. 1. The energy state of the control solenoid 23 is determined and controlled by the controller 30, also shown in FIG. 1. The control solenoid 23 may include a ferrous core 42, around which is wrapped a winding or a coil 44. When energized via the electrical control signals 25 shown in FIG. 1, an electrical current flows through the coil 44. Magnetic flux (arrow 29) is generated in the ferrous core 42 and in the plunger 50 as shown.

Still referring to FIG. 2, the plunger 50 may be constructed of a material relative having a low reluctance relative to air, for instance iron. As is understood in the art, magnetic reluctance and magnetic resistance are terms that are analogous to electrical resistance. Thus, magnetic flux (arrow 29) follows the path of least magnetic reluctance, e.g., through iron rather than through free space.

The controller 30 of FIG. 1 is configured to generate a time-varying electrical signal as the electrical control signals 25 during the engagement phase of the EM clutch assembly 20. The controller 30 transmits the time-varying electrical signal to the solenoid 23 when engagement is required, e.g., during a particular mode change in the transmission 18 of FIG. 1. This resonates the plunger 50 toward, and ultimately into direct physical contact with, the mechanical feature 60 of the input disc 115, thereby transitioning the EM clutch assembly 20 to an engaged state as shown in FIG. 2. The controller 30 is also configured to transmit a DC electrical signal to the solenoid 23 as the electrical control signals 25 to thereby lock and hold the EM clutch assembly 20 in the engaged state.

Figure 3:
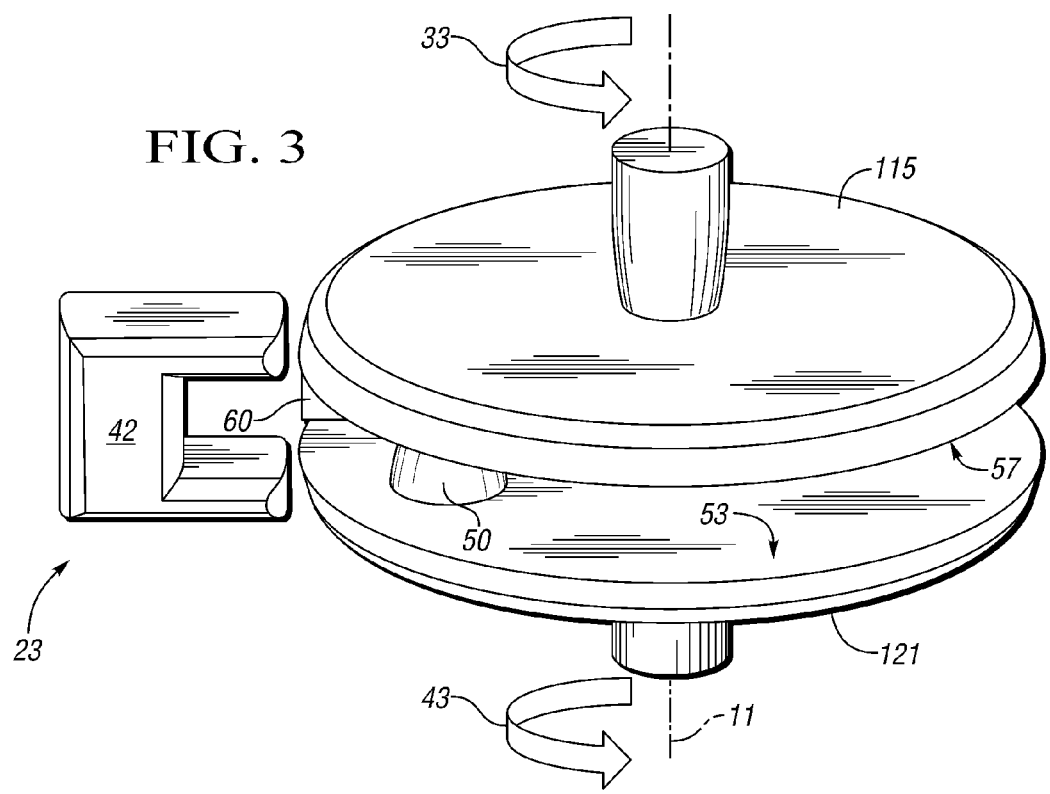
FIG. 3 is a perspective view illustration of a portion of the present EM clutch assembly.

Referring to FIG. 3, a perspective view is provided of the input disc 115 and the output disc 121 shown in FIG. 2 and described above. The control solenoid 23 is shown with its ferrous core 42. For simplicity, the coil 44 of FIG. 2 is omitted. Excitation of the control solenoid 23 with the electrical control signals 25 (see FIG. 1) after the speeds 33 and 43 have been properly synchronized resonates the plunger 50 toward the input face 57. Once the plunger 50 is within a calibrated distance of the input face 57, i.e., an engageable position, the controller 30 can transition the electrical control signals 25 to a DC signal suitable for capturing and holding the plunger 50.

The discs 115, 121 are then allowed to rotate relative to each other until the plunger 50 encounters the mechanical feature 60, a portion of which is shown in FIG. 3. Once the engagement surface of the plunger 50 is engaged with the mechanical feature 60, the electrical control signals 25 may be reduced so that there is only an amount of force sufficient for retaining the plunger 50 in the engaged position.

Figure 4:
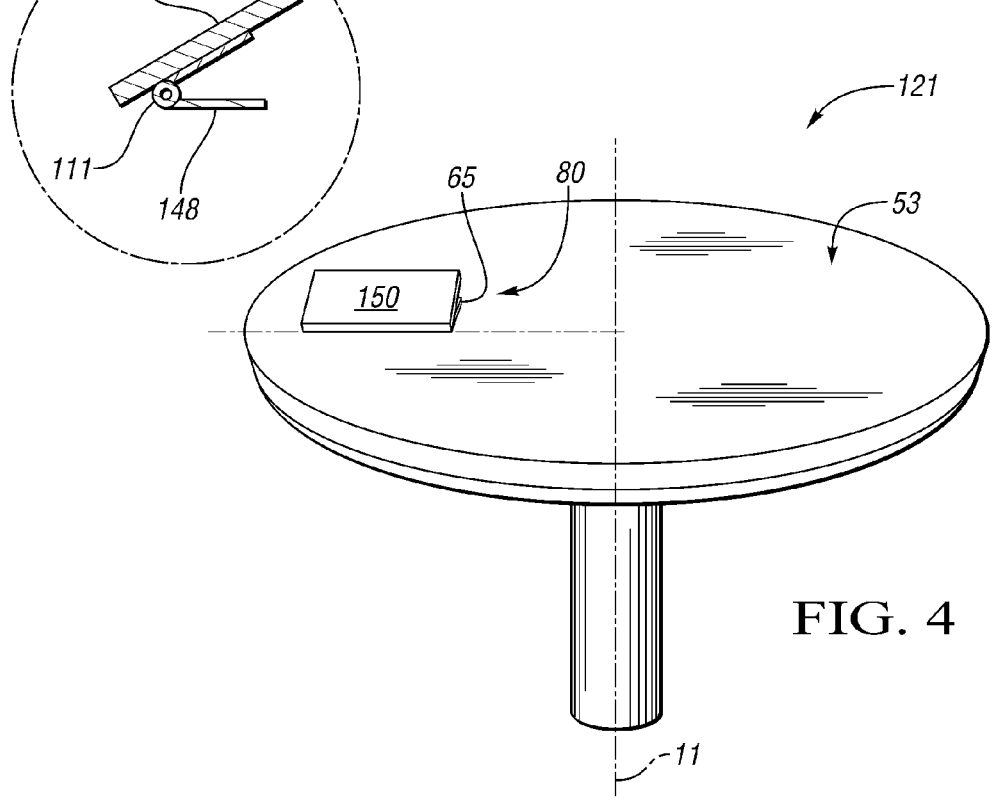
FIG. 4 is a perspective view illustration of a portion of the present EM clutch assembly according to a possible embodiment.

Referring to FIG. 4, in an alternative embodiment the output disc 121 may include a plunger 150 configured as a flapper or a strut. In this embodiment, the plunger 150 may be positioned within the bore 65 defined by the bore wall 46 shown in FIG. 2 so as to deploy from the surface 53. However, as shown in the inset 80, the plunger 150 is biased by a spring 148, e.g., a spring clip as shown, having an axis 111 which may be parallel to the axis of rotation 11, although the axis 111 may be parallel to the axis 11 in another embodiment. The plunger 150 has sufficient room to swing into and out of the bore 65. The spring 148 maintains the plunger 150 in a neutral position in the bore 65. The plunger 150 may extend beyond the axis 111 as shown to provide a counterweight sufficient for mitigating impact between the plunger 150 and the mechanical feature 60 of FIG. 3.

Referring to FIGS. 5 and 6, another alternative plunger 250 may be configured with a shape which is complementary to that of a mechanical feature 160. When the plunger 250 is not properly aligned with the mechanical feature 160 (FIG. 5), movement of the plunger 250 toward the input face 57 is blocked by the mechanical feature 160, as indicated by the starburst pattern. When properly aligned (FIG. 6), the complementary shapes of the mechanical feature 160 and plunger 250 enable the plunger 250 to engage with the mechanical feature 160, as indicated by arrow 80, thus allowing torque to be transferred between the discs 115 and 121.

Referring to FIG. 7 in conjunction with the structure of FIG. 4, a method 100 may be used to control the EM clutch assembly 20. Beginning with step 102, the controller 30 of FIG. 1 may synchronize the speeds (arrows 33 and 43) of the respective input and output discs 115 and 121. When these speeds are substantially equal, i.e., a minimal relative speed, the controller 30 proceeds to step 104.

At step 104, the controller 30 resonates the plunger 50 toward the input disc 115 using a time-varying input signal, which is transmitted to the control solenoid 23 as the electrical control signals 25 shown in FIG. 1.

Referring briefly to FIG. 8, an example time plot 75 describes such a resonation of the plunger 50, which occurs in response to the magnetic flux (arrow 29 of FIG. 2). The X axis represents time, while the Y axis represents the amplitude of the various signals. Trace 71 describes a possible voltage signal, i.e., the electrical control signals 25 of FIG. 1, while trace 91 describes the changing position of the plunger 50 as the plunger 50 resonates toward the input disc 115.

Within trace 71, a series of voltage steps 70, 72, and 74 cause gradually changing positions 90, 92, and 94 (trace 91) in the plunger 50, with an increasing amplitude corresponding to closer positioning of the plunger 50 relative to the input disc 115. When the plunger 50 is within a calibrated distance from the input face 57, the controller 30 proceeds to step 106.

At step 106 of FIG. 7, the controller 30 transitions to a steady state DC signal to capture the plunger 50, i.e., to maintain the position of the plunger 50 relative to the input disc 115. As shown in FIG. 8, this is depicted via voltage step 76. Note that position 96 is held at a steady state position 95 via the steady-state voltage step 76.

At step 108, while the plunger 50 remains captured, the controller 30 allows the discs 115 and 121 to rotate relative to each other until the plunger 50 physically encounters the mechanical feature 60. Once the mechanical feature 60 is encountered, the controller 30 proceeds to step 110.

At step 110, the controller 30 may thereafter reduce the DC retaining current, i.e., the amplitude of step 76 shown in FIG. 8, so that an electrical force sufficient for maintaining the plunger 50 in the engaged position remains, for instance the position shown in FIG. 6.

While the best modes for carrying out the invention have been described in detail, those familiar with the art to which this invention relates will recognize various alternative designs and embodiments for practicing the invention within the scope of the appended claims.

The invention claimed is:

1. An electromagnetic (EM) clutch assembly comprising:
an input disc operatively connected to a rotatable input member, wherein the input disc defines an input face having a mechanical feature;
an output disc operatively connected to a rotatable output member, wherein the output disc includes a bore wall defining a bore;
a plunger positioned at least partially within the bore;
a control solenoid; and
a controller configured to:
transmit a time-varying electrical control signal to the control solenoid to thereby resonate the plunger toward the input disc;
transmit a steady-state electrical control signal to the control solenoid to capture the plunger in an engageable position; and
control rotation of the input and output discs until the plunger encounters the mechanical feature, thereby placing the EM clutch assembly in an engaged state.

2. The EM clutch assembly of claim 1, wherein the plunger is constructed of a material having a magnetic reluctance that is substantially less than that of free air.

3. The EM clutch assembly of claim 2, wherein the plunger is constructed at least partially of iron, and is biased by a spring.

4. The EM clutch assembly of claim 3, wherein the plunger is configured as a flapper, and wherein the spring has an axis which is perpendicular to the axis of rotation of the input and output discs.

5. The EM clutch assembly of claim 1, wherein the controller is configured to transmit the time-varying electrical signal as one of a time-varying voltage signal and a time-varying current signal.

6. The EM clutch assembly of claim 1, wherein the controller is configured to substantially synchronize the rotational speeds of the discs.

7. The EM clutch assembly of claim 1, wherein the controller is configured to reduce the steady-state electrical control signal after the EM clutch is engaged until a threshold electrical force exists for maintaining the EM clutch in the engaged state.

8. A vehicle comprising:
a transmission having a rotatable input shaft and a rotatable output shaft;
an electromagnetic (EM) clutch assembly having:
an input disc operatively connected to a rotatable input shaft, wherein the input disc defines an input face having a mechanical feature;
an output disc operatively connected to a rotatable output shaft, wherein the output disc includes a bore wall defining a bore;
a plunger positioned at least partially within the bore; and
a control solenoid; and
a controller configured to:
transmit a time-varying electrical control signal to the control solenoid to thereby resonate the plunger toward the input disc;
transmit a steady-state electrical control signal to the control solenoid to capture the plunger in an engageable position; and
control rotation of the input and output discs until the plunger encounters the mechanical feature, thereby placing the EM clutch assembly in an engaged state.

9. The vehicle of claim 8, wherein the plunger is constructed of a material having a magnetic reluctance that is substantially less than that of free air.

10. The vehicle of claim 9, wherein the plunger is configured as a flapper or a strut, and is biased by a spring clip.

11. The vehicle of claim 8, wherein the controller is configured to transmit the time-varying electrical signal as one of a time-varying voltage signal and a time-varying current signal.

12. The vehicle of claim 8, wherein the controller is configured to substantially synchronize the rotational speeds of the discs.

13. The vehicle of claim 8, wherein the controller is configured to reduce the steady-state electrical control signal after the EM clutch is engaged until a threshold electrical force exists for maintaining the EM clutch in the engaged state.

14. A method for controlling an electromagnetic (EM) clutch assembly having an input disc having a mechanical feature, an output disc defining a bore wall, a plunger which moves within a bore defined by the bore wall, and a control solenoid, the method comprising:

transmitting a time-varying electrical control signal from a controller to the control solenoid to thereby resonate the plunger toward the input disc;

transmitting a steady-state electrical control signal to the control solenoid to capture the plunger in an engageable position; and controlling rotation of the input and output discs until the plunger encounters the mechanical feature, thereby placing the EM clutch assembly in an engaged state.

15. The method of claim 14, wherein the control solenoid includes a coil which is wound on a ferrous core, and wherein transmitting the time-varying and steady-state electrical control signals includes generating magnetic flux in the ferrous core and in the plunger to thereby resonate the plunger.

16. The method of claim 14, wherein the time-varying and steady state electrical signals include a DC voltage signal.

* * * * *